Patented Apr. 20, 1926.

1,581,826

UNITED STATES PATENT OFFICE.

OSCAR BALLY, OF BASEL, SWITZERLAND, ASSIGNOR TO THE FIRM: HACO-GESELL-SCHAFT A.-G. BERN, OF BERN, SWITZERLAND.

ARSENICAL ALBUMEN COMPOUND AND METHOD OF MAKING THE SAME.

No Drawing.    Application filed November 23, 1923.   Serial No. 676,564.

*To all whom it may concern:*

Be it known that I, OSCAR BALLY, a citizen of Switzerland, residing at Basel, Switzerland, have invented certain new and useful Improvements in Arsenical Albumen Compounds and Methods of Making Same, of which the following is a specification.

My invention refers to organic arsenic compounds and more especially to an arsenical compound of albumen insoluble in water which has highly bactericidal properties and is adapted for use as an antiseptic.

I have ascertained that organic arsenic compounds of the aromatic series such as for instance dihydroxydiamino-arsenobenzene, atoxyl, arsacetin and the like show a great affinity towards different kinds of albuminous bodies and more especially towards the nucleo proteids of the kind to which yeast albumen belongs, these derivatives being capable of entering into new combinations with these bodies, such combinations containing a high percentage of arsenic and being insoluble in water, but having retained their albuminous character. These new products have been found to have strong bactericidal properties which render them suited for use as antiseptics.

In practicing my invention for the production of such new products, I may for instance proceed as follows:

Example 1.

90 kilos dry yeast deprived of bitterness are stirred for some hours with 500 liters cold water in a closed vessel provided with a stirring device and a steam coil, until the yeast is sufficiently steeped, whereupon the temperature is raised to about 90° C. The air in the apparatus is displaced by introducing an inert gas, for instance nitrogen, carbonic acid gas and the like. 10 kilos sodium 3.3'- diamino-4.4'- dihydroxyarsenobenzene-N-methylene sulfinate are thereafter added. The mixture is kept under continuous stirring during about 2 hours at a temperature of 90–100° C. The brownish grey color of the yeast now changes to a yellowish shade. After cooling, the yeast, on which the arsenic compound is now fixed, is separated from the liquid by centrifuging or filtration and dried in vacuo at a moderate temperature. The product thus obtained, after having been pulverized, has the appearance of a brownish to yellowish-grey powder, insoluble in water. The analysis results in an arsenic contents of 1.7 percent, corresponding to 8.5 percent sodium 3.3'- diamino - 4.4' - dihydroxyarsenobenzene - N - methylene sulfinate.

By employing larger quantities of the arsenobenzol compound, the percentage of such compound can be materially increased, the color of the product being thereby rendered more intensely yellow.

The yeast deprived of bitterness can also be replaced by raw yeast in fresh or dried condition, or by yeast nucleines or nucleinic acids or other albuminous bodies of analogous properties; similarly the sodium 3.3'- diamino - 4.4' - dihydroxyarsenobenzene - N - methylene sulfinate can be replaced by other arseno compounds of the type R—As= As—R.

Example 2.

45 kilos raw dry yeast are well stirred with 200 liters water in a trough provided with an open steam coil and are heated to 90–100° C. 5 kilos sodium arsanilate (atoxyl) are dissolved in 30 liters water and slowly introduced into the boiling yeast mesh. After introducing steam during ½ to 1 hour, the atoxyl is completely fixed on the yeast. The further treatment is carried through as described with respect to Example 1. The product obtained has the outward appearance of raw dry yeast and its percentage of arsenic is 3.1.

Example 3.

90 kilos dry yeast deprived of bitterness are stirred with 300 liters water and allowed to steep 24 hours. The mass is then heated with steam under good stirring. 40 kilos acetyl arsanilic acid (arsacetin) are then added and the temperature is kept on 90–100° C. during one to two hours. Further treatment as described with reference to Example 2. The product obtained contains 1.31% arsenic.

Example 4.

22.5 kilos casein are stirred with 100 liters water and are carefully heated with steam to 40–50° C. After 2–3 hours 2.5 kilos arsanilic acid (atoxyl) in 30 liters water are added and vigorous stirring is continued for some time. A strong current of steam is then conducted through the mass, until the casein is coagulated. After drying up to 60° the product represents a glass-like light colored mass which, on being comminuted, forms an almost white powder insoluble in water and containing 1.46% As.

I wish it to be understood that I do not desire to be limited to the exact details given above with respect to the substances, quantities and other conditions of working, as obvious modifications will occur to a person skilled in the art. I may, for instance, work with higher or lower dilution or with higher or lower temperature; in these cases the time of reaction will naturally be varied also.

Additions of sodium chloride or other inert salts, in some cases also weak acids are sometimes apt to influence the reaction in a favorable sense.

I claim:—

1. As a new composition of matter, the combination of an organic arsenic compound of the aromatic series with yeast, such combination forming a compound insoluble in water and possessing high bactericidal properties.

2. As a new composition of matter, the combination of an arseno compound of the type R—As=As—R (in which R stands for any substituted benzene nucleus) with yeast, such combination forming a compound insoluble in water and possessing high bactericidal properties.

3. As a new composition of matter, the combination of sodium 3.3'-diamino-4.4'-dihydroxyarsenobenzene-N-methylene sulfinate with an albuminous body, such combination forming a compound insoluble in water and possessing high bactericidal properties.

4. As a new composition of matter, the combination of sodium 3.3'-diamino-4.4'-dihydroxyarsenobenzene-N-methylene sulfinate with yeast, such combination forming a compound insoluble in water, possessing high bactericidal properties and containing 1.7% arsenic.

5. The method of making arsenical albuminous compounds insoluble in water consisting in acting with an organic arsenic compound of the aromatic series upon yeast.

6. The method of making arsenical albuminous compounds insoluble in water consisting in acting with a dihydroxydiamino arsenobenzene upon yeast.

7. The method of making arsenical albuminous compounds insoluble in water consisting in acting with 10 parts sodium 3.3'-diamino-4.4'-dihydroxyarsenobenzene-N-methylene sulfinate upon a suspension of 90 parts dry yeast at an elevated temperature.

In testimony whereof I affix my signature.

OSCAR BALLY.